(12) United States Patent
Zhang et al.

(10) Patent No.: US 12,315,527 B2
(45) Date of Patent: May 27, 2025

(54) METHOD AND SYSTEM FOR SPEECH RECOGNITION

(71) Applicant: ALIBABA GROUP HOLDING LIMITED, Grand Cayman (KY)

(72) Inventors: Shiliang Zhang, Hangzhou (CN); Ming Lei, Hangzhou (CN)

(73) Assignee: ALIBABA GROUP HOLDING LIMITED, Grand Cayman (KY)

( * ) Notice: Subject to any disclaimer, the term of this patent is extended or adjusted under 35 U.S.C. 154(b) by 405 days.

(21) Appl. No.: 17/428,015

(22) PCT Filed: Feb. 3, 2020

(86) PCT No.: PCT/CN2020/074178
§ 371 (c)(1),
(2) Date: Aug. 3, 2021

(87) PCT Pub. No.: WO2020/164397
PCT Pub. Date: Aug. 20, 2020

(65) Prior Publication Data
US 2022/0028404 A1 Jan. 27, 2022

(30) Foreign Application Priority Data

Feb. 12, 2019 (CN) .......................... 201910111593.1

(51) Int. Cl.
*G10L 21/0216* (2013.01)
*G10L 15/06* (2013.01)
(Continued)

(52) U.S. Cl.
CPC ........ *G10L 21/0216* (2013.01); *G10L 15/063* (2013.01); *H04R 3/005* (2013.01); *H04R 3/04* (2013.01); *G10L 2021/02166* (2013.01)

(58) Field of Classification Search
CPC ........ G10L 2021/02166; G10L 15/063; H04R 2430/20; H04R 3/005
See application file for complete search history.

(56) References Cited

U.S. PATENT DOCUMENTS 5,586,191 A  12/1996  Elko et al.
5,854,999 A  12/1998  Hirayama
(Continued)

FOREIGN PATENT DOCUMENTS

CN  101194182 A  *  6/2008  ............ G01S 15/96
CN  102271299 A     12/2011
(Continued)

OTHER PUBLICATIONS

Rogozan, Alexandrina, and Paul Deléglise. "Adaptive fusion of acoustic and visual sources for automatic speech recognition." Speech Communication 26.1-2 (1998): 149-161. (Year: 1998).*

(Continued)

*Primary Examiner* — Paras D Shah
*Assistant Examiner* — Oluwadamilola M Ogunbiyi
(74) *Attorney, Agent, or Firm* — James J. DeCarlo; Greenberg Traurig, LLP

(57) ABSTRACT

Embodiments of the disclosure provide a method and system for speech recognition. The method comprises dividing space into a plurality of regions based on preset DOA angles to allocate a signal source to the plurality of regions, wherein signals in the plurality of regions are enhanced and recognized, the result of which are fused to obtain a recognition result of the signal source.

16 Claims, 3 Drawing Sheets

(51) Int. Cl.
*H04R 3/00* (2006.01)
*H04R 3/04* (2006.01)

(56) References Cited

U.S. PATENT DOCUMENTS

| | | | |
|---|---|---|---|
| 6,138,094 A | 10/2000 | Miet et al. | |
| 6,574,597 B1 | 6/2003 | Mohri et al. | |
| 6,633,842 B1 | 10/2003 | Gong | |
| 8,762,145 B2 | 6/2014 | Ouchi et al. | |
| RE45,379 E | 2/2015 | Rowe | |
| 8,976,978 B2 | 3/2015 | Kitazawa et al. | |
| 9,076,450 B1* | 7/2015 | Sadek | H04R 1/406 |
| 9,286,897 B2 | 3/2016 | Bisani et al. | |
| 9,443,516 B2 | 9/2016 | Katuri et al. | |
| 9,576,582 B2 | 2/2017 | Ljolje et al. | |
| 9,653,070 B2 | 5/2017 | Chang et al. | |
| 10,349,172 B1* | 7/2019 | Huang | H04R 3/04 |
| 10,622,004 B1* | 4/2020 | Zhang | G10L 25/78 |
| 10,943,583 B1* | 3/2021 | Gandhe | G10L 15/183 |
| 10,971,158 B1* | 4/2021 | Patangay | H04L 67/10 |
| 11,574,628 B1* | 2/2023 | Kumatani | G06N 3/084 |
| 2002/0042712 A1 | 4/2002 | Yajima et al. | |
| 2002/0120443 A1* | 8/2002 | Epstein | G10L 15/20 704/E15.039 |
| 2004/0024599 A1 | 2/2004 | Deisher | |
| 2008/0089531 A1 | 4/2008 | Koga et al. | |
| 2009/0018828 A1* | 1/2009 | Nakadai | G10L 15/20 704/E21.013 |
| 2009/0018833 A1* | 1/2009 | Kozat | G10L 15/32 704/E15.018 |
| 2009/0030552 A1* | 1/2009 | Nakadai | G10L 21/028 704/275 |
| 2010/0217590 A1* | 8/2010 | Nemer | G01S 3/8006 704/E15.039 |
| 2011/0293107 A1 | 12/2011 | Kitazawa et al. | |
| 2013/0332165 A1 | 12/2013 | Beckley et al. | |
| 2014/0112487 A1* | 4/2014 | Laska | H04M 9/082 381/92 |
| 2015/0095026 A1* | 4/2015 | Bisani | H04R 3/005 704/232 |
| 2015/0161999 A1* | 6/2015 | Kalluri | G06F 16/433 704/257 |
| 2016/0005394 A1* | 1/2016 | Hiroe | G10L 21/0272 704/248 |
| 2016/0034811 A1* | 2/2016 | Paulik | G06N 3/045 706/20 |
| 2016/0171977 A1 | 6/2016 | Siohan et al. | |
| 2016/0217789 A1* | 7/2016 | Lee | G10L 15/32 |
| 2016/0275954 A1 | 9/2016 | Park et al. | |
| 2016/0322055 A1* | 11/2016 | Sainath | H04R 3/005 |
| 2017/0105074 A1* | 4/2017 | Jensen | G01S 3/8036 |
| 2017/0278513 A1* | 9/2017 | Li | G10L 15/20 |
| 2018/0233129 A1 | 8/2018 | Bakish et al. | |
| 2018/0240471 A1* | 8/2018 | Markovich Golan | G10L 21/0232 |
| 2018/0270565 A1* | 9/2018 | Ganeshkumar | G10L 25/84 |
| 2018/0330745 A1* | 11/2018 | Ebenezer | H04R 3/005 |
| 2019/0073999 A1* | 3/2019 | Prémont | G10L 15/08 |
| 2019/0115039 A1* | 4/2019 | Du | H04R 1/222 |
| 2019/0341050 A1* | 11/2019 | Diamant | G06V 40/172 |
| 2019/0341053 A1* | 11/2019 | Zhang | H04L 12/1827 |
| 2020/0075033 A1* | 3/2020 | Hijazi | G06N 3/086 |
| 2020/0175961 A1* | 6/2020 | Thomson | G10L 15/28 |
| 2020/0335088 A1* | 10/2020 | Gao | H04R 3/04 |
| 2020/0342846 A1* | 10/2020 | Cai | G10K 11/17873 |
| 2020/0342887 A1 | 10/2020 | Xu et al. | |
| 2021/0005184 A1* | 1/2021 | Rao | G10L 15/187 |
| 2021/0312914 A1* | 10/2021 | Hedayatnia | G10L 19/00 |

FOREIGN PATENT DOCUMENTS

| | | | | |
|---|---|---|---|---|
| CN | 105161092 A | | 12/2015 | |
| CN | 105765650 A | | 7/2016 | |
| CN | 107742522 A | | 2/2018 | |
| CN | 108877827 A | | 11/2018 | |
| CN | 108922553 A | | 11/2018 | |
| CN | 109272989 A | | 1/2019 | |
| CN | 110047478 A | * | 7/2019 | |
| CN | 108702458 B | * | 7/2021 | G06F 3/165 |
| EP | 2710400 B1 | * | 3/2021 | G01S 5/0072 |
| JP | 2004198656 A | * | 7/2004 | G06N 3/008 |
| KR | 101658001 B1 | | 9/2016 | |
| WO | WO-2018171223 A1 | * | 9/2018 | B25J 11/0005 |
| WO | WO-2020034095 A1 | * | 2/2020 | H04R 1/02 |

OTHER PUBLICATIONS

Stefanakis, Nikolaos, Despoina Pavlidi, and Athanasios Mouchtaris. "Perpendicular cross-spectra fusion for sound source localization with a planar microphone array." IEEE/ACM Transactions on Audio, Speech, and Language Processing 25.9 (2017): 1821-1835. (Year: 2017).*

Alexandridis, Anastasios, and Athanasios Mouchtaris. "Multiple sound source location estimation in wireless acoustic sensor networks using DOA estimates: The data-association problem." IEEE/ACM Transactions on Audio, Speech, and Language Processing 26.2 (2017): 342-356. (Year: 2017).*

Vincent, Emmanuel, et al. "An analysis of environment, microphone and data simulation mismatches in robust speech recognition." Computer Speech & Language 46 (2017): 535-557. (Year: 2017).*

International Search Report to corresponding International Application No. PCT/CN2020/074178, mailed Apr. 21, 2020 (2 pages).

* cited by examiner

METHOD AND SYSTEM FOR SPEECH RECOGNITION

CROSS-REFERENCE TO RELATED APPLICATIONS

The present application is a national stage entry of Int'l Appl. No. PCT/CN2020/074178, filed on Feb. 3, 2020, which claims priority to the Chinese Patent Application No. 201910111593.1, filed on Feb. 12, 2019, both of which are incorporated by reference herein in their entirety.

BACKGROUND

Technical Field

The disclosure relates to, but is not limited to, signal processing technologies, and in particular, to methods and systems for speech recognition.

Description of Related Art

Presently, a far-field speech recognition system generally includes two components. The first component is a front-end signal enhancement component for processing received, multichannel noisy speech signals to obtain enhanced, single-channel speech signals. The front-end signal enhancement component partially reduces noise interferences by utilizing correlations between speech signals on multiple channels, thereby improving signal-to-noise ratios (SNRs) of the signals. The second component is a back-end speech recognition (e.g., automatic speech recognition (ASR)) component for providing the single-channel speech signals processed by the front-end signal enhancement component to a general-purpose speech recognition system to obtain final speech recognition results.

In a complex environment, it is challenging to estimate SNRs and signal source directions for signals. In other words, it is difficult for the present far-field speech recognition technology to guarantee the accuracy of speech recognition results.

BRIEF SUMMARY

Embodiments of the disclosure provide methods and systems for speech recognition to ensure the accuracy of speech recognition results.

In one embodiment, the disclosure provides a method for speech recognition, the method comprising allocating a signal source based on different directions of arrival (DOAs); enhancing signals of the signal source corresponding to the different DOAs, respectively; performing speech recognition on the enhanced signals corresponding to the different DOAs, respectively, to obtain recognition results corresponding to the different DOAs; providing the recognition results corresponding to the different DOAs to respective acoustic models; and fusing output results from the acoustic models to obtain a recognition result.

In one embodiment, allocating a signal source based on different DOAs comprises dividing a space into a plurality of regions to allocate the signal source into the plurality of regions formed based on different DOA angles. In one embodiment, the DOA angles comprise at least one of an angle of 30 degrees, 60 degrees, 90 degrees, 120 degrees, or 150 degrees. In one embodiment, enhancing signals of the signal source corresponding to different DOAs comprises performing delay-and-sum (DAS) beamforming on the signals of the signal source corresponding to the different DOAs, respectively, to obtain the enhanced signals.

In one embodiment, the enhancing signals of the signal source corresponding to the different DOAs comprises: performing Minimum Variance Distortionless Response (MVDR) beamforming on the signals of the signal source corresponding to the different DOAs, respectively, to obtain the enhanced signals.

In one example, the method further comprises, prior to allocating a signal source, dividing space into regions based on the different DOAs; performing speech enhancement on speech signals in the different regions to obtain different enhanced signal samples; and using the obtained samples to perform training to obtain the acoustic models corresponding to the different DOAs.

In one embodiment, the providing the recognition results corresponding to the different DOAs to respective acoustic models, and fusing output results from the acoustic models to obtain a recognition result comprises: providing the recognition results corresponding to the different DOAs into the respective acoustic models, and fusing output results from the acoustic models to obtain the recognition result.

In one embodiment, the fusion is performed by using a Recognizer Output Voting Error Reduction (ROVER) based fusion system.

In one embodiment, the disclosure provides a computer-readable storage medium configured to store computer-executable instructions for performing the method for speech recognition of the disclosure as described above.

In one embodiment, the disclosure provides a device for information sharing, the device comprising a memory and a processor, wherein the memory is configured to store instructions, when executed by the processor, instructing the device to perform the method for speech recognition of the disclosure as described above.

In one embodiment, the disclosure provides a speaker, the speaker comprising a memory and a processor, wherein the memory is configured to store instructions, when executed by the processor, instructing the speaker to perform the method for speech recognition of the disclosure as described above.

In one embodiment, the disclosure provides a system for speech recognition, the system comprising a preprocessing module, a first processing module, a second processing module, and a recognition module. The preprocessing module is configured to allocate a signal source according to different DOAs. The first processing module is configured to enhance signals of the signal source corresponding to the different DOAs, respectively. The second processing module is configured to perform speech recognition on the enhanced signals corresponding to the different DOAs, respectively, to obtain recognition results corresponding to the different DOAs. The recognition module is configured to provide the recognition results corresponding to the different DOAs to respective acoustic models and fuse output results from the acoustic models to obtain a recognition result.

In one embodiment, the device further comprises a training module configured to divide space into regions according to the different DOAs; perform speech enhancement on speech signals in the different regions to obtain different samples of enhanced signals; and use the obtained samples to perform training to obtain the acoustic models corresponding to the different DOAs.

To ensure accuracy of speech recognition results, embodiments of the disclosure provide for allocating a signal source according to different DOAs; enhancing signals of the signal source corresponding to the different DOAs, respectively;

performing speech recognition on the enhanced signals corresponding to the different DOAs, respectively, to obtain recognition results corresponding to the different DOAs; providing the recognition results corresponding to the different DOAs to respective acoustic models; and fusing output results from the acoustic models to obtain a recognition result. According to various embodiments of the disclosure, space is divided into a number of regions according to preset DOA angles to allocate a signal source to the different spatial regions. Further, signals in the different spatial regions are enhanced and recognized, the results of which are fused to obtain a recognition result of the signal source. As such, according to the embodiments of the disclosure, it is no longer required that a real signal source direction be estimated at every moment, which avoids the problems of inaccurate recognition caused by estimating SNRs and signal source directions for signals in a complex environment, thereby ensuring the accuracy of speech recognition results.

Other features and advantages of the disclosure will be described in the following description, and part of the features and advantages are apparent in the description or are understood by implementing the disclosure. The objectives and other advantages of the disclosure can be implemented or obtained by means of the structures specifically pointed out in the description, claims, and accompanying drawings.

BRIEF DESCRIPTION OF THE DRAWINGS

The drawings are used to provide a further understanding of the technical solution provided by some embodiments of the disclosure and constitute a part of the description. Together with embodiments of the disclosure, the drawings are used to explain the technical solution of some embodiments of the disclosure but do not constitute a limitation to the technical solution of the disclosure.

DETAILED DESCRIPTION OF EMBODIMENTS

In order to clarify the objectives, technical solutions, and advantages of the disclosure, embodiments of the disclosure will be described in detail below with reference to the accompanying drawings. It should be noted that the embodiments of the disclosure and features in the embodiments can be combined with each other arbitrarily if there is no conflict.

In some embodiments of the disclosure, a computing device includes one or more processors (CPU), an input/output interface, a network interface, and a memory.

The memory may include a computer-readable medium in the form of a non-permanent memory, a Random Access Memory (RAM), and/or non-volatile memory or the like, such as a Read-Only Memory (ROM) or a Flash memory (Flash RAM). In one embodiment, the memory is an example of the computer-readable medium.

The computer-readable medium may include permanent and non-permanent, removable and non-removable media and store information by any method or technology. The information may be a computer-readable instruction, a data structure, a module of a program, or other data. Examples of computer storage media may include, but are not limited to, a phase change memory (PRAM), a static random access memory (SRAM), a dynamic random access memory (DRAM), other types of RAM, ROM, electrically erasable programmable read-only memories (EEPROM), flash memories or other memory technologies, compact disc read-only memories (CD-ROM), digital versatile disks (DVD) or other optical storage, magnetic tape cassettes, magnetic tape, and magnetic disk storage or other magnetic storage devices, or any other non-transmission media. The computer storage media may be used to store information that can be accessed by computing devices. According to the definitions herein, the computer-readable medium does not include non-transitory computer-readable media, such as a modulated data signal and a carrier wave.

In various embodiments, steps shown in the flow diagram of the drawings can be performed at a computer system executing, for example, a set of computer-executable instructions. Moreover, although a logical order is shown in the flow diagram, in some embodiments, the steps shown or described herein may be performed in a different order.

Figure 1:
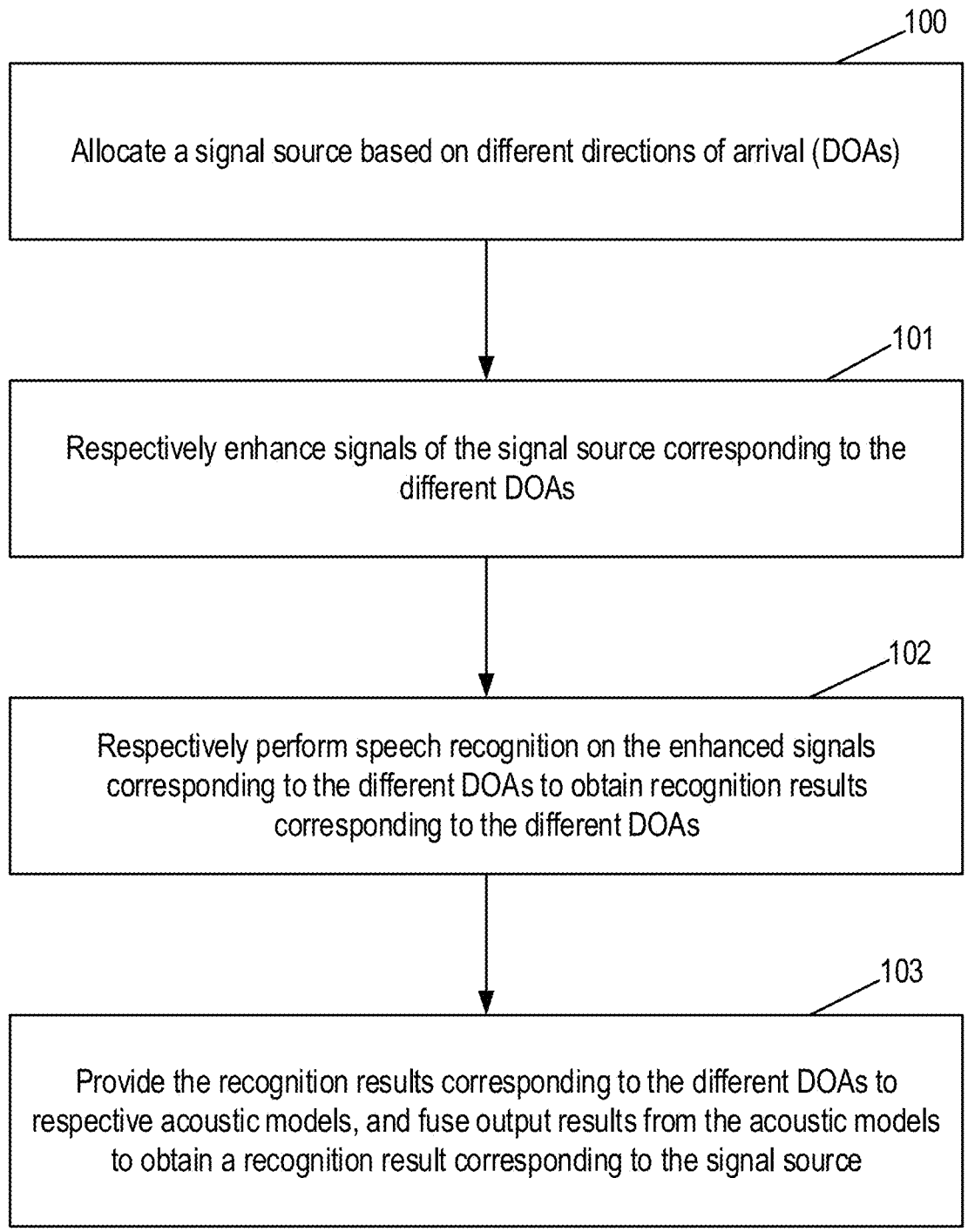
FIG. 1 is a flow diagram illustrating a method for speech recognition according to some embodiments of the disclosure.

FIG. 1 is a flow diagram illustrating a method for speech recognition according to some embodiments of the disclosure. In some embodiments and as shown in FIG. 1, the method can comprise the following steps.

Step 100: allocate a signal source according to different DOAs.

As sound waves reach different microphones in a microphone array with delays, these delays can be used to calculate a specific angle (e.g., a specific DOA angle) in which a target sound source (e.g., the signal source in step 100) may be in space. When the DOA cannot be accurately estimated, the space can be divided into different directions, based on which it is assumed that the target sound source is in that direction.

In some embodiments, the space is divided into a plurality of regions according to at least one preset DOA angle, which can be, for example, 30 degrees, 60 degrees, 90 degrees, 120 degrees, 150 degrees, etc. This way, it is determined that the signal source is located in those regions based on the DOA angles. That is, the signal source is allocated to the regions formed by the different DOA angles. It should be noted herein that the signal source may be mobile, and therefore may be in different regions corresponding to DOA angle at different moments, nevertheless definitely being in a certain region corresponding to DOA angles.

In a complex environment, it is difficult to estimate an SNR and signal source direction for signals. Therefore, according to embodiments of the disclosure, it may not be required that an estimation of a real signal source direction be made at every moment. Instead, space is divided into regions according to preset DOA angles such that it is assumed that the signal source appears in those regions corresponding to DOA angles. By assuming that the signal source always is within the range of a certain region formed by the DOA angles, subsequently, signal enhancement can be performed separately, targeting on the signal source in each of the regions.

Step 101: enhance signals of the signal source corresponding to the different DOAs, respectively.

Figure 2:
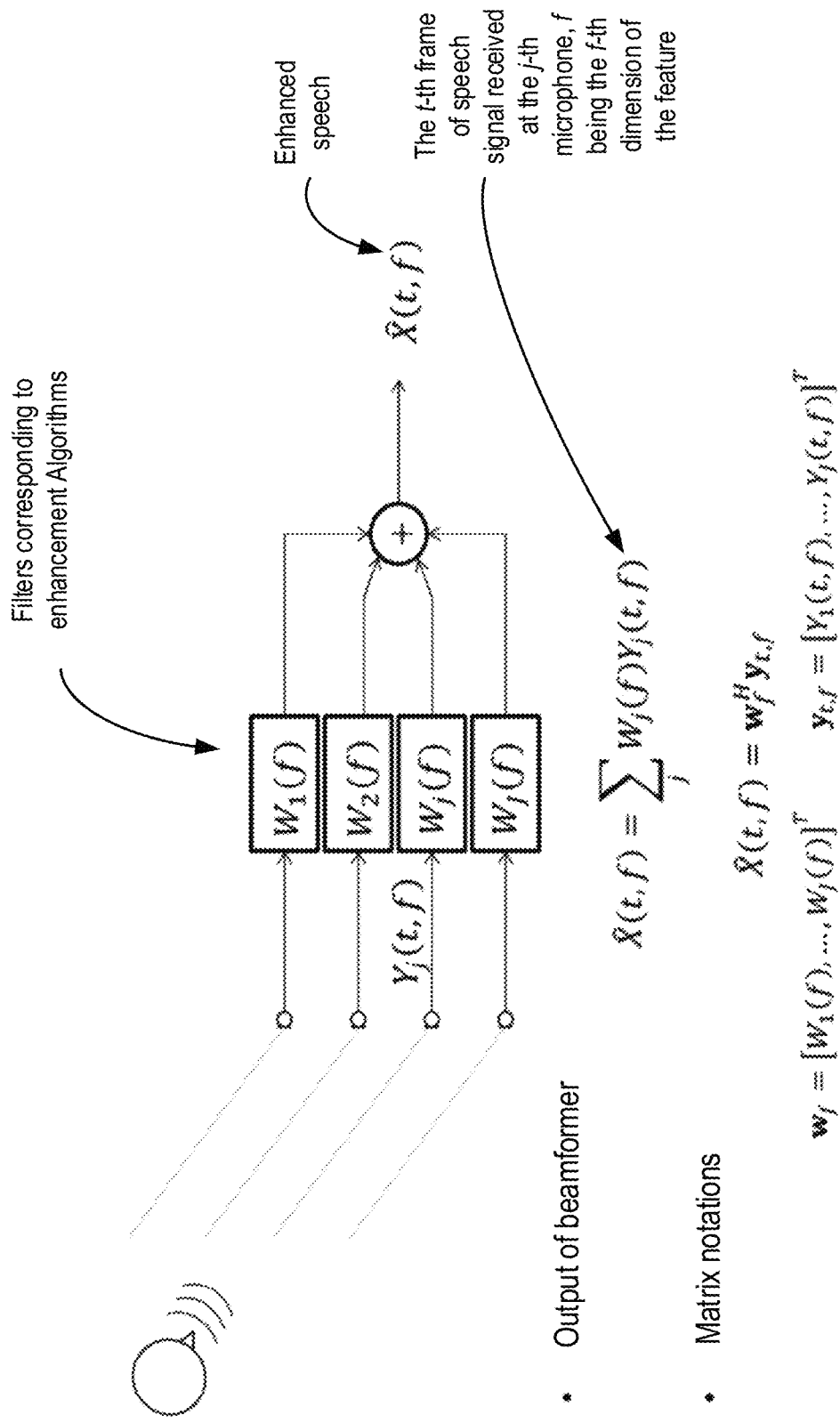
FIG. 2 is a diagram illustrating a method for delay-and-sum beamforming according to some embodiments of the disclosure.

In some embodiments, the enhancement processing may include performing a delay-and-sum (DAS) beamforming method, respectively, on the signals from the signal source corresponding to the different DOAs, to obtain enhanced signals. FIG. 2 illustrates an exemplary DAS beamforming method according to some embodiments of the disclosure. The specific implementation may vary, and the example here is only for illustration and not intended to limit the scope of the disclosure.

In some embodiments, the enhancement processing may include performing an MVDR beamforming method, respectively, on the signals from the signal source corresponding to the different DOAs, to obtain the enhanced signals.

Step 102: perform speech recognition on the enhanced signals corresponding to the different DOAs, respectively, to obtain recognition results corresponding to the different DOAs.

In some embodiments, performing speech recognition may include the use of, for example, an ASR system.

Here, in this illustrated embodiment of the disclosure, because beamforming is performed on the signals corresponding to the different DOAs, a number of recognition results corresponding to the different DOAs are obtained after speech recognition via, for example, the ASR system.

Step 103: provide the recognition results corresponding to the different DOAs to respective acoustic models and fuse output results from the acoustic models to obtain a recognition result corresponding to the signal source.

In some embodiments, prior to step 103, the method can further include dividing space into regions according to the different DOAs; performing speech enhancement on speech signals in the different regions to obtain different enhanced signal samples; and using the obtained samples to perform training to obtain the acoustic models corresponding to the different DOAs. Any training methods available may be utilized for implementation, for example, by using those of the related art. The specific implementation is not intended to limit the scope of the disclosure.

In some embodiments, step 103 may further include providing the recognition results corresponding to the different DOAs into the respective trained acoustic models, and fusing the output results from the acoustic models by using, for example, a Recognizer Output Voting Error Reduction (ROVER)-based fusion system, to obtain the final recognition result corresponding to the signal source.

In some embodiments, the fusion may be implemented using a fusion system that is based on a Recognizer Output Voting Error Reduction (ROVER) method.

According to various embodiments of the disclosure, space is divided into a number of regions according to preset DOA angles to allocate a signal source to the different spatial regions. Based on this, signals in the different spatial regions are enhanced and recognized, the results of which are fused to obtain a recognition result for the signal source. That is, according to embodiments of the disclosure, it is not required that an estimation of a real signal source direction be made at every moment, avoiding the problem of inaccurate recognition caused by estimating SNRs and signal source directions of signals in a complex environment, thereby ensuring the accuracy of speech recognition results.

In some embodiments, the disclosure further provides a computer-readable storage medium configured for storing computer-executable instructions for performing the method for speech recognition of the disclosure as described above.

In some embodiments, the disclosure further provides a device for information sharing, the device comprising a memory and a processor, where the memory is configured to store computer-executable instructions, when executed by the processor, causing the device to perform the method for speech recognition of the disclosure as above described.

In some embodiments, the disclosure further provides a speaker, the speaker comprising a memory and a processor, where the memory is configured to store computer-executable instructions, when executed by the processor, causing the speaker to perform the method for speech recognition of the disclosure as above described.

Figure 3:
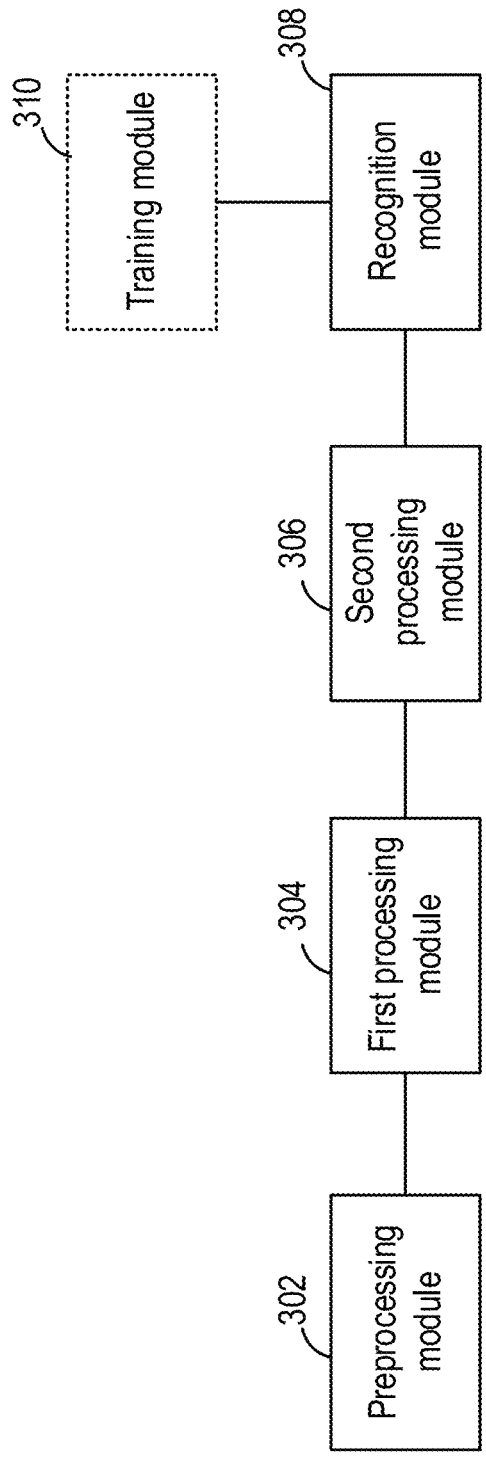
FIG. 3 is a block diagram illustrating a system for speech recognition according to some embodiments of the disclosure.

FIG. 3 is a block diagram illustrating a system for speech recognition according to some embodiments of the disclosure. In some embodiments and as shown in FIG. 3, the system for speech recognition comprises a preprocessing module (302), a first processing module (304), a second processing module (306), and a recognition module (308).

The preprocessing module (302) is configured to allocate a signal source according to different DOAs.

The first processing module (304) is configured to enhance signals of the signal source corresponding to the different DOAs, respectively.

The second processing module (306) is configured to perform speech recognition on the enhanced signals corresponding to the different DOAs, respectively, to obtain recognition results corresponding to the different DOAs.

The recognition module (308) is configured to provide the recognition results corresponding to the different DOAs to respective acoustic models and fuse output results from the acoustic models to obtain a recognition result.

In some embodiments, the preprocessing module (302) is further configured to: divide the space into a plurality of regions according to at least one preset DOA angle (e.g., an angle of 30 degrees, 60 degrees, 90 degrees, 120 degrees, 150 degrees, etc.) such that it is assumed that the signal source appears in those DOA angle regions. That is, the signal source is allocated to the regions formed based on the different DOA angles.

In some embodiments, the first processing module (304) is further configured to perform a DAS beamforming method on the signals of the signal source corresponding to the different DOAs, respectively, to obtain the enhanced signals. Alternatively, the first processing module (304) is further configured to perform an MVDR beamforming method on the signals of the signal source corresponding to the different DOAs, respectively, to obtain the enhanced signals.

In some embodiments, the second processing module (306) may include an ASR system.

In some embodiments, the recognition module (308) is further configured to provide the recognition results corresponding to the different DOAs to the respective trained acoustic models, and then fuse recognition results from the acoustic models by using, for example, a ROVER-based fusion system, to obtain the recognition result corresponding to the signal source.

In some embodiments, the device for speech recognition provided by the disclosure further includes a training module (310) configured to: divide space into regions according to the different DOAs; perform speech enhancement on speech signals in the different regions to obtain different enhanced signal samples; and use the obtained samples to perform training to obtain the acoustic models corresponding to the different DOAs.

It should be noted that the various modules in the system for speech recognition of the disclosure may be individually disposed in different physical devices, or may be disposed in a plurality of physical devices after appropriate combination, or all may be included in the same physical device.

Although the embodiments of the disclosure are disclosed as above, the content described therein is only embodiments used to facilitate the understanding of the disclosure and is not intended to limit the disclosure. A person skilled in the art to which the disclosure belongs can make any modifications or changes in the implementation form or details insofar as the modifications or changes do not depart from the spirit and scope disclosed in the disclosure. However, the scope of patent protection of the disclosure should still be subject to the scope defined by the appended claims.

What is claimed is:

1. A method comprising:
    allocating a signal source based on different directions of arrival (DOAs) by dividing a physical space into a plurality of non-overlapping regions to allocate the signal source into the plurality of regions, the allocation performed prior to beamforming, the plurality of non-overlapping regions based on preset DOA angles comprising at least two of: an angle of 30 degrees, an angle of 60 degrees, an angle of 90 degrees, an angle of 120 degrees, and an angle of 150 degrees;
    enhancing signals of the signal source for each of the regions to obtain enhanced signals corresponding to the regions, the enhancing performed independently for each region;
    performing speech recognition on the enhanced signals corresponding to the regions to obtain recognition results corresponding to the regions;
    providing the recognition results corresponding to the regions to respective acoustic models, each acoustic model trained for its corresponding region based on enhanced signal samples from that region; and
    fusing outputs of the acoustic models to obtain a recognition result, wherein fusing analyzes outputs from all preset regions regardless of estimated signal source direction.

2. The method of claim 1, the enhancing signals of the signal source corresponding to the regions comprising performing delay-and-sum (DAS) beamforming on the signals of the signal source corresponding to the regions to obtain the enhanced signals.

3. The method of claim 1, the enhancing signals of the signal source corresponding to the regions comprising performing Minimum Variance Distortionless Response (MVDR) beamforming on the signals of the signal source corresponding to the regions to obtain the enhanced signals.

4. The method of claim 1, further comprising:
    dividing, prior to the allocating the signal source, a space into regions according to the regions;
    performing speech enhancement on speech signals in the different regions to obtain different enhanced signal samples; and
    using the obtained samples to perform training to obtain the acoustic models corresponding to the regions.

5. The method of claim 1, the fusing output results is performed by using a Recognizer Output Voting Error Reduction (ROVER) based fusion system.

6. A system comprising:
    a processor; and
    a storage medium for tangibly storing thereon program logic for execution by the processor, the stored program logic comprising:
        logic, executed by the processor, for allocating a signal source based on different directions of arrival (DOAs) by dividing a physical space into a plurality of non-overlapping regions to allocate the signal source into the plurality of regions, the allocation performed prior to beamforming, the plurality of non-overlapping regions based on preset DOA angles comprising at least two of: an angle of 30 degrees, an angle of 60 degrees, an angle of 90 degrees, an angle of 120 degrees, and an angle of 150 degrees,
        logic, executed by the processor, for enhancing signals of the signal source for each of the regions to obtain enhanced signals corresponding to the regions, the enhancing performed independently for each region, respectively,
        logic, executed by the processor, for performing speech recognition on the enhanced signals corresponding to the regions to obtain recognition results corresponding to the regions, each acoustic model trained for its corresponding region, logic, executed by the processor, for providing the recognition results corresponding to the regions to respective acoustic models based on enhanced signal samples from that region, and
        logic, executed by the processor, for fusing output results from the acoustic models to obtain a recognition result, wherein the fusing analyzes outputs from all preset regions regardless of estimated signal source direction.

7. The system of claim 6, the logic for allocating a signal source based on regions comprising: logic, executed by the processor, for dividing a space into a plurality of regions to allocate the signal source into the plurality of regions formed based on DOA angles.

8. The system of claim 6, the logic for enhancing signals of the signal source corresponding to the regions comprising: logic, executed by the processor, for performing delay-and-sum (DAS) beamforming on the signals of the signal source corresponding to the regions to obtain the enhanced signals.

9. The system of claim 6, the logic for enhancing signals of the signal source corresponding to the regions comprising: logic, executed by the processor, for performing Minimum Variance Distortionless Response (MVDR) beamforming on the signals of the signal source corresponding to the regions to obtain the enhanced signals.

10. The system of claim 6, the stored program logic further comprising:
    logic, executed by the processor, prior to the allocating the signal source, for dividing a space into regions according to the regions,
    logic, executed by the processor, for performing speech enhancement on speech signals in the different regions to obtain different enhanced signal samples, and
    logic, executed by the processor, for using the obtained samples to perform training to obtain the acoustic models corresponding to the regions.

11. The system of claim 6, the fusing output results is performed by using a Recognizer Output Voting Error Reduction (ROVER) based fusion system.

12. A non-transitory computer-readable storage medium for tangibly storing computer program instructions capable of being executed by a computer processor, the computer program instructions defining:
    allocating a signal source based on different directions of arrival (DOAs) by dividing a physical space into a plurality of generally non-overlapping regions to allocate the signal source into the plurality of regions, the allocation performed prior to beamforming, the plurality of non-overlapping regions based on preset DOA angles comprising at least two of: an angle of 30 degrees, an angle of 60 degrees, an angle of 90 degrees, an angle of 120 degrees, and an angle of 150 degrees;

enhancing signals of the signal source for each of the regions to obtain enhanced signals corresponding to the regions, the enhancing performed independently for each region;

performing speech recognition on the enhanced signals corresponding to the regions to obtain recognition results corresponding to the regions;

providing the recognition results corresponding to the regions to respective acoustic models, each acoustic model trained for its corresponding region based on enhanced signal samples from that region; and fusing output results from the acoustic models to obtain a recognition result, wherein the fusing analyzes outputs from all preset regions regardless of estimated signal source direction.

13. The computer-readable storage medium of claim 12, the allocating a signal source based on regions comprising: dividing a space into a plurality of regions to allocate the signal source into the plurality of regions.

14. The computer-readable storage medium of claim 12, the enhancing signals of the signal source corresponding to the regions comprising: performing delay-and-sum (DAS) beamforming on the signals of the signal source corresponding to the regions to obtain the enhanced signals.

15. The computer-readable storage medium of claim 12, the enhancing signals of the signal source corresponding to the regions comprising performing Minimum Variance Distortionless Response (MVDR) beamforming on the signals of the signal source corresponding to the regions to obtain the enhanced signals.

16. The computer-readable storage medium of claim 12, further comprising:

dividing, prior to the allocating the signal source, a space into regions according to the regions;

performing speech enhancement on speech signals in the different regions to obtain different enhanced signal samples; and using the obtained samples to perform training to obtain the acoustic models corresponding to the regions.

\* \* \* \* \*